United States Patent [19]
Funakubo

[11] 3,763,721
[45] Oct. 9, 1973

[54] METHOD OF PRODUCING A BAND SAW BLADE

[75] Inventor: Toshiei Funakubo, Odawara, Japan

[73] Assignee: Kabushiji-Kaisha Eishin, Tokyo, Japan

[22] Filed: Oct. 6, 1972

[21] Appl. No.: 295,734

Related U.S. Application Data

[62] Division of Ser. No. 80,389, Oct. 13, 1970, abandoned.

[52] U.S. Cl. .................................. 76/112, 51/309
[51] Int. Cl. ......................... B23d 65/00, B24d 3/02
[58] Field of Search ............... 76/112; 51/309, 293; 29/95, 194, 195; 125/21

[56] References Cited
UNITED STATES PATENTS

| | | | |
|---|---|---|---|
| 3,615,309 | 10/1971 | Dawson | 51/309 |
| 2,906,612 | 9/1959 | Anthony et al. | 51/309 |
| 3,503,108 | 3/1970 | Kidgell et al. | 29/95 X |

Primary Examiner—Leonidas Vlachos
Attorney—B. Edward Shlesinger et al.

[57] ABSTRACT

A strip of carbon tool steel is joined at both ends thereof to form an endless band and flinders formed by crushing a molded and sintered super hard alloy are brazed by hard solder or welded by electron beam welding at random to one of the two longitudinal edges of said band so that the flinders project radially outwardly from said edge, and provide sharp edges and corners which work as cutting teeth, and form, with the band, a band saw blade. Some of said flinders extend from the edge transversely to the plane of the strip and project outwardly to such a distance that saw dust produced during the cutting operation can clear the path of cut of the saw blade.

5 Claims, 4 Drawing Figures

METHOD OF PRODUCING A BAND SAW BLADE

This application is a division of application Ser. No. 80,389, filed Oct. 13, 1970, now abandoned.

This invention relates to a method of forming a band saw blade, and more particularly to a method of forming a band saw blade wherein a strip of carbon tool steel is joined at both ends thereof to form an endless band and then a plurality of flinders are brazed by means of hard solder or welded by electron beam welding at random to one of the two longitudinal edges of the band so that they project radially outwardly from said edge. The flinders are formed by crushing an alloy predominantly containing tungsten carbide, an alloy of multi-carbides containing as their major portion tungsten carbides and as their minor portion titanium and/or tantalum carbide, an alloy of carbides predominantly containing tantalum and/or vanadium carbides or ceramics predominantly containing aluminum oxides, all of which are respectively produced by molding and sintering their powdery constituents, or by crushing melted and molded silicon dioxides. The flinders are provided with sharp edges and corners which work as cutting teeth; and some of the flinders, which extend from the edge transversely to the plane of the strip, project outwardly to such an extent that saw dusts produced during the cutting operation clear the path of movement of the band saw blade.

A considerable number of experiments have been conducted and a number of new methods have been developed for affording edges of teeth of a band saw blade which have high heat and abrasion resistance. A saw blade made in accordance with the present invention is based on an entirely new knowledge, however, and is entirely different from the blades of the prior art.

In U. S. Pat. No. 3,023,490, for instance, there is disclosed forming upon a surface, which is subject to wear in use, a hard-wearing armor coating, having a smooth surface conforming exactly to the shape of said surface, by applying evenly on said surface a temporary liquid binder, dropping a mixture of flux, a refractory metallic material such as tungsten carbide, and a hard matrix alloy in powder form over the film of said liquid binder so that the mixture will adhere to the working surface and form a thin powdery layer. The surface is then heated, thereby brazing to said surface a hard-wearing armor coating consisting of a matrix composed of the hard alloy and powdery refractory metallic materials embedded in said matrix. The method disclosed in said U. S. Pat. and explained in brief above would advantageously be applicable for effectively armouring cutting tools primarily provided with cutting teeth or surfaces, but could hardly be applicable to the present invention, namely, a band saw blade which is not originally formed with any cutting tooth.

U. S. Pat. No. 3,104,562 discloses another method for armouring edges of cutting teeth of a saw blade, in which a spherical tip made from a super hard alloy, such a tungsten carbide, is insertedly fitted into a circular crater formed at the edge of each cutting tooth and brazed thereto. This method is inpracticable on an industrial basis, because it requires extremely elaborate technics and equipment to produce tips of small dimension by molding and sintering powdery constituents of the super hard alloy, and moreover, it is nearly impossible to economically finish the tip, when brazed to the edge of a cutting tooth, to a desired configuration. When this method is compared to the present invention, what has been said regarding U. S. Pat. No. 3,023,490 would also be applicable to said method, since the present invention is entirely different from the technic disclosed in U. S. Pat. No. 3,104,562. To wit, in the manufacture of a band saw blade in accordance with the present invention, it is not required to machine a strip of carbon tool steel to form cutting teeth on one of its longitudinal edges, but a plurality of flinders of a super hard alloy, which are primarily provided with sharp edges and corners and brazed or welded by electron beam welding to said longitudinal edge, work by themselves as cutting teeth, thereby eliminating the machining operation for providing cutting teeth on the saw and the subsequent operations for armouring said teeth disclosed in the aforementioned two U. S. patents. Furthermore, the conventional laborious operation for setting cutting teeth is eliminated in the present invention. It should be noted also that flinders adapted as the cutting teeth of a cutter made according to the present invention are not like the spherical tips described in U. S. Pat. No. 3,104,562 which are formed by molding and sintering powdery constituents of a super hard alloy into spherical form, but are obtained by crushing a block or plate of super hard alloys which are produced by molding and sintering their powdery constituents. Thereby the flinders are provided primarily with sharp edges and corners which are most suitable as cutting edges. The manufacture of such flinders is extremely easy, compared to the conventional method in which such flinders have to be formed by molding and sintering powdery constituents of a super hard alloy within molds having complex inner contours. The great number of molds having complex inner contours, which correspond to the required outer contours of the sharp edges and corners of such flinders, cost too much for manufacturing a saw blade at a reasonable price. And, it is not proper to sinter powdery alloys, which have been wetted before sintering, without using a mold for the production of such flinders, because the powdery constituents wetted before the sintering become spherical on account of surface tension which works strongly on the constituents especially when they are pressed into lumps having comparatively small dimensions; and they never can be provided with the sharp edges and corners provided on the flinders in the method of the present invention.

As a prior art disclosing the manufacture of a high speed cutting band saw blade, in which cutting teeth are formed after armouring a carbon steel backing band, U. S. Pat. No. 3,315,548 might be cited. Said patent teaches a method of manufacturing an armoured high speed cutting saw blade, which in brief comprises welding a wire of high speed cutting tool steel to one edge of a carbon steel backing band and cutting said bimetallic edge to form along said edge teeth of the desired size and shape. This method is, however, accompanied by the drawback that only the tips of the teeth are formed of high speed cutting tool steel and the greater part of said tool steel is cut off from the blade, whereby the loss of expensive tool steel is inevitably great. The present invention, which is not accompanied by the drawback mentioned above and in which the tooth cutting operation is eliminated, is far superior to the technic disclosed in U. S. Pat. No. 3,315,548.

Hence, it is an object of the present invention to provide a band saw blade having as its cutting teeth a plurality of flinders made of super hard alloy and brazed or welded to one of longitudinal edges of a strip of carbon tool steel, whereby the tooth cutting operation is eliminated.

It is another object of the present invention to provide a band saw blade of the type, in which flinders of super hard alloys are obtained by inducing thermal stress inside super hard alloys which are made by molding and sintering their powdery constituents and then crushing them, whereby the flinders are provided with sharp edges and corners which withstand well hard and tough cutting operations.

It is still another object of the present invention to provide a band saw blade of the type, in which some of those flinders, which project transversely to the plane of blade, work as if they were set teeth in a conventional band saw blade, whereby the conventional tooth setting operation is eliminated.

Other objects and advantages arising from the practice of the present invention will be apparent from a consideration of the accompanying specification and from the acompany drawings which show preferred embodiments of this invention wherein.

Figure 1:
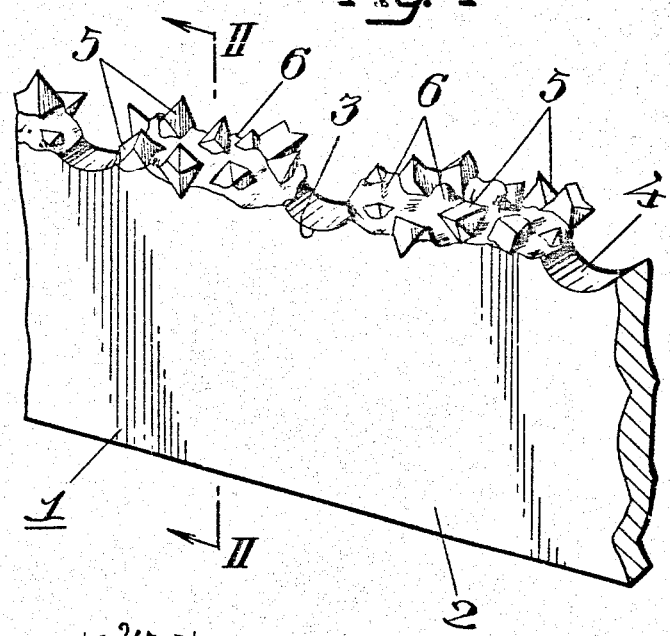
FIG. 1 is an enlarged explanatory perspective view of a part of the band saw blade made in accordance with a first embodiment of the present invention, in which flinders are brazed to one edge thereof by means of hard solder.
Figure 2:
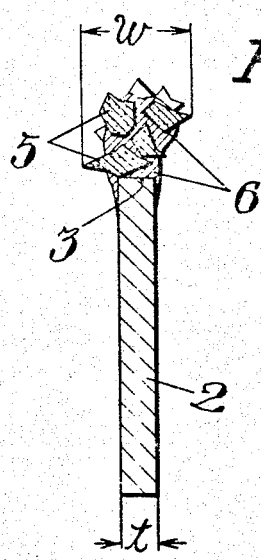
FIG. 2 is a coss section of the blade taken along the line line II—II in FIG. 1.

Now first referring to FIGS. 1 and 2, which illustrate a band saw blade made in accordance with the first embodiment, a plurality of flinders 5 of super hard alloy are brazed by means of hard solder 6 to one of longitudinal edges 3 of a strip of carbon tool steel 2 which forms a band saw blade 1 when the two ends thereof are brazed or welded directly together without any solder therebetween. While a number of inwardly curved simicircular portions 4 are provided in the edge 3 with a specific distance therebetween, they do not necessarily constitute essential parts of the present invention, but act, in cooperation with those flinders, which project outwardly from the edge 3 transversely to the plane of strip 2, to prevent the cutting resistance between the blade and the material to be cut by the blade from being too excessive and also work to make it easy to discharge saw dust from a kerf. Flinders 5 are produced by crushing a block or piece of super hard alloy or ceramic, made by molding and sintering powdery constituents, or melted and molded silicon dioxides after inducing thermal stress inside them by heating them at a temperature between 1,000°C and 1,200°C and subsequently cooling them rapidly to a temperature between 0°C to −80°C. The flinders thus obtained are provided with sharp edges and corners which can act effectively as cutting teeth or edges. They may be sieved for removing therefrom those of fine mesh, if required.

Some of the flinders 5 which project outwardly from the edge 3 transversely to the strip steel plate 2 have a lateral working width w, which substantially corresponds to the setting width in a conventional band saw blade. Said width w preferably is 1.3 to 1.7 times the thickness t of the plate 2.

For the purpose of better understanding of the present invention, an example of the first embodiment thereof is given hereinunder.

EXAMPLE 1

An alloy made by molding and sintering a mixture of 92 percent by weight of tungsten carbide, 2 percent by weight of titanium and tantalum carbides, and 6 percent by weight of cobalt, each in powder form, was heated to a temperature about 1,100°C, quenched in an atmosphere, cooled by dry ice to a temperature around −70°C, and crushed into flinders by a hammer. When observed by a microscope, it was found that the flinders thus obtained had been provided with a number of sharp edges and corners. The flinders were passed through a JIS standard sieve of 840 $\mu$.

A strip of carbon tool steel containing 0.8 − 0.9 percent of carbon and 25 mm width and 0.8 mm thickness was heated along one of its longitudinal edges to a temperature around 600°C. A flux melted by a temperature between about 950°C and 1,000°C was applied over said heated edge. And, subsequently, hard solder, predominantly containing nickel and melted by heating it to a temperature around 1,300°C, was flowed on the edge, and the aforementioned flinders were dropped at random onto the said molten solder.

The edge thus obtained had complex configurations as illustrated in the accompanying drawing. Both ends of the tool steel were brazed to form an endless band saw blade. The band saw blade thus produced was mounted on a band sawing machine, and rotated at a speed of 500m/second for cutting a block of stone while applying water thereonto to cool the cutting teeth. The saw blade stood up well in cutting said material.

While in the above Example, there were utilized flinders made from an alloy of multi-carbides, they may be formed, as stated in the preamble of the present specification, by crushing alloys predominantly containing tungsten carbides, alloys predominantly containing tantalum and/or vanadium carbides, or ceramics predominantly containing aluminum oxides, all of which are produced by molding and sintering their powdery constituents, or by crushing melted and molded silicon dioxides provided that where ceramic alloys or silicon dioxides are utilized, the flinders made from these materials should be metallized before brazing them. It should be noted also that while in the foregoing Example, the alloy was heated and cooled before crushing it into flinders, heating is not always necessary but helps to induce greater thermal stress inside the alloy when it is cooled.

Figure 4:
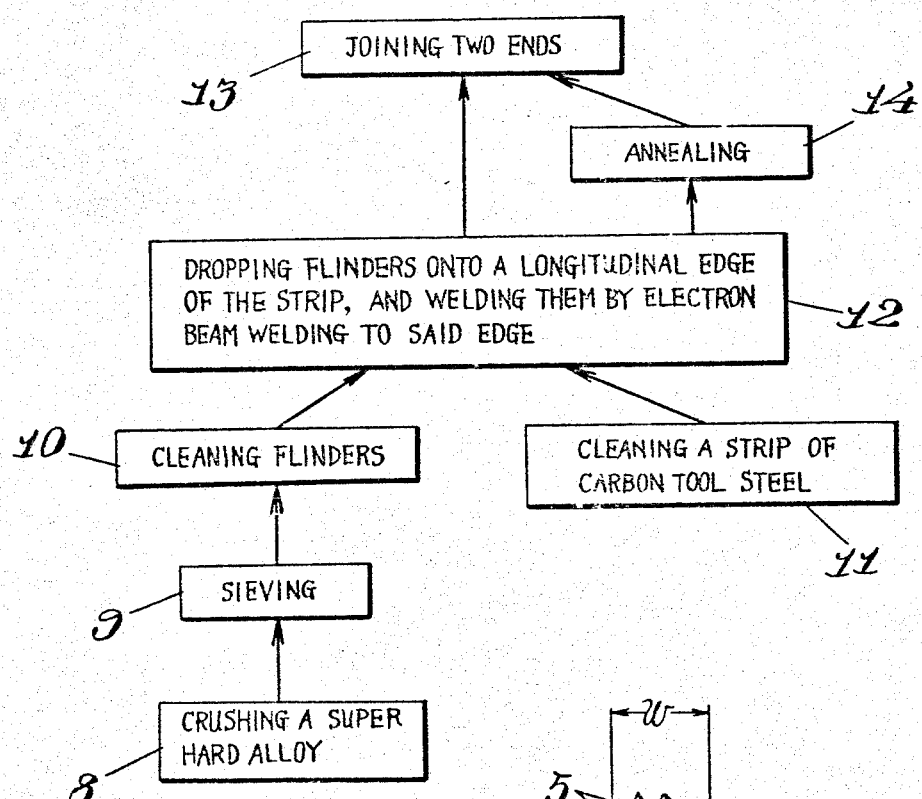
FIG. 4 is a block diagram showing the steps for producing the band saw blade of the second embodiment.
Figure 3:
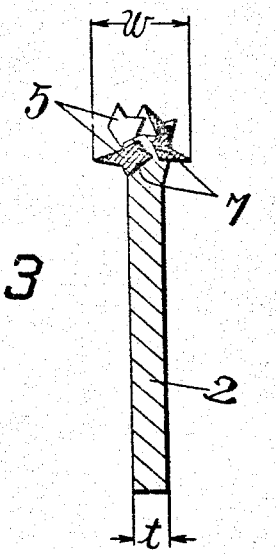
FIG. 3 is a cross section of the band saw blade made in accordance with the second embodiment of the present invention, in which flinders are welded to one of edges thereof by electron beam welding.

Now next, referring to FIGS. 3 and 4, which illustrate a band saw blade made in accordance with the second embodiment, and in which the parts identical to those in FIGS. 1 and 2, a plurality of flinders 5 of super hard alloys are directly welded by electron beam welding to one of longitudinal edges 3 of a strip of carbon tool steel 2 which forms a band saw blade 1 when the two ends thereof are jointed together. Numeral 7 indicates the parts of flinders 5 which are embedded in the edge 3 and welded to said edge.

The process involved in the second embodiment of the present invention is to heat the edge 3 to a temperature at which said edge is brought to a molten state but without melting the flinders, by inpinging a highly concentrated sharply focused beam of electrons upon said edge, to produce continuous molten ponds along said edge of a depth which is less than the diameter of flinders, and then allowing the flinders partially to embed in said ponds because of the difference in specific gravities between the molten steel and the flinders, resulting in welding parts of the flinders to the edge so that the parts of the flinders, which are not embedded in the ponds, project radially outwardly from the edge to form sharp cutting edges.

The steps involved in manufacturing a band saw in accordance with the second embodiment are diagrammatically illustrated in FIG. 4. Flinders 5 are formed (Block 8) by crushing a super hard alloy, which has been molded and sintered into a block or plate, after inducing thermal stress inside thereof, (Block 9), followed by the step of cleaning or degreasing the flinders (Block 10). The saw blade 1 is also subjected to a cleaning or degreasing step (Block 11). The saw blade 1 thus treated is forwarded at an appropriate speed into a welding chamber kept under a rarified atmosphere, and flinders 5 of the desired diameter which have been cleaned or degreased are dropped at random in an appropriate amount onto the edge 3 of blade (Block 12). Synchronized with the passing of the blade, with flinders on its edge, into the welding chamber, a highly concentrated sharp beam of electrons, which is focused to a diameter substantially corresponding to the width of the blade, is impinged upon the edge from an electron gun located above the welding chamber. Since the structures of welding chamber and electron gun do not constitute inventive features of the present invention, detailed explanations are omitted here. It should be noted, however, that the welding power should be such that the edge of the blade can partially be melted and the flinders 5 can partially be embedded in the melted portions of the edge by the difference of specific gravities of the flinders and the melted steel, but that the flinders per se are not melted. The blade, thus provided with flinders which have been welded to its edge, might be annealed (Block 14), if required. The strip of steel is then cut into a desired length and joined together at both ends thereof.

When a band saw blade made in accordance with the first embodiment is compared to that of the second embodiment, the latter has superiorities over the former in that 1) the active metallic constituents of the flinders are not adversely affected during the welding operation, since the operation is held under a rarified atmosphere, 2) change of mechanical property of the blade material can be avoided and the thermal stress which often occurs within materials which are subjected to welding can be suppressed to a minimum, since the welding by an electron beam is perfored by heating the material at the narrowest possible zone, and 3) the productivity is very high, since the heating area in the electron beam welding is very narrow and consequently the cooling and hardening of the welded portions are rapid, compared to other welding or brazing methods. The first embodiment has, however, a superiority to the second embodiment in that it does not require expensive equipment.

For the purpose of better understanding of the present invention in accordance with the second embodiment, an example thereof is given hereinunder.

EXAMPLE 2

An alloy made by molding and sintering a mixture of 92 percent by weight of tungsten carbide, 2 percent by weight of titanium and tantalum carbides and 6 percent by weight of cobalt, each in powder form was heated to a temperature about 1,100°C, quenched in atmosphere, cooled by dry ice to a temperature around −70°C, and crushed into flinders by a crusher. When observed by a microscope, it was found that the flinders thus obtained had been provided with a number of sharp edges and corners. The flinders were passed through a JIS standard sieve of 840 $\mu$ in order to obtain those of about 0.8mm in diameter.

A strip of carbon tool steel, containing 0.8 – 0.9 percent of carbon and 25 mm width and 0.8mm thickness, which had been cleaned and degreased, was passed through a welding chamber under a rarified atmosphere, while dropping at random onto one of its edges the aforementioned flinders. Said edge with flinders scattered thereon was subjected, in the welding chamber, to a highly concentrated sharp beam of electrons emitted from an electron gun located above said chamber and focused to about 0.8mm in diameter. The welding input power of said electron gun was adjusted so that the depth of ponds of molten steel on the edge was about 0.4mm and the temperature thereof about 1,650°C. The flinders scattered on the edge were embedded in the molten steel to about half their diameter and firmly welded to said edge when it was cooled. The strip of steel thus provided with flinders, which had been welded to its edge, was cut and brazed together at both ends thereof. The band saw blade thus produced was mounted on a band sawing machine, and rotated at a speed of about 550m/second for cutting a block of cast iron. The saw blade stood up well for cutting this material.

Experiments have shown that electron beam welding adaptable in the performance of the present invention has a wide latitude in its parameters. For instance, in an experiment conducted by the inventor, the acceleration voltage was 30KV, beam current 50mA, and welding speed 450m/second.

As apparent from the above description, the present invention produces a band saw blade having entirely novel structure, which is extremely simple and cheap in production, and still provided with high cutting efficiency. Moreover, since the flinders brazed or welded to the edge of blade and acting as cutting edges or teeth could be from scrap alloys, the manufacturing cost of the present blade can be very low, compared to conventional band saw blades provided with armoured teeth.

Having thus described my invention, what I claim is:

1. The method of making a saw which comprises molding and sintering a mixture of alloys in powder form and selected from the group consisting of tungsten carbide, tantalum carbide, vanadium carbide, ceramics containing aluminum oxide, and silicon dioxide, to form a block of super hard alloy, crushing said block to form flinders having sharp edges and corners, heating a tool steel body along at least one of its edges to a high temperature, and depositing the flinders random-wise on said body so that they are located in pools formed in said one edge by the heating of said one edge and then allowing said edge and the pools therein to cool to secure said flinders to said body.

2. The method claimed in claim 1, wherein the block is heated to a temperature between 1000°C and 1200°C, then cooled rapidly to a temperature between 0°C and −80°C, and then crushed into flinders.

3. The method of making a saw which comprises molding and sintering a mixture of alloys in powdered form and selected from the group consisting of tungsten carbide, tantalum carbide, vanadium carbide, ceramics containing aluminum oxide, and silicon dioxide to form a block of super hard alloy, crushing said block to form flinders having sharp edges and corners, applying over one edge of a tool steel body a hard solder by heating and flowing the solder on said edge, depositing the flinders randomwise on said solder so that they are located in pools formed in said solder, and then allowing said solder and the pools therein to cool to secure said flinders to said body.

4. The method according to claim 1, wherein said edge is heated by impinging a highly concentrated, sharply focused welding beam on said edge to heat said edge below the melting point of said flinders thereby to produce continuous molten ponds on said edge of a depth less than the height of said flinders so that the flinders are embedded partially only in said ponds, and allowing the ponds to cool, to secure said flinders to said body.

5. The metod according to claim 3, wherein said edge is partially melted only by said welding beam, and said flinders are partially embedded in the melted portions of said edge by the difference in specific gravities of said flinder and the melted steel of said body.

* * * * *